US 12,305,882 B2

(12) United States Patent
Miura et al.

(10) Patent No.: US 12,305,882 B2
(45) Date of Patent: May 20, 2025

(54) HUMIDIFYING UNIT

(71) Applicant: DAIKIN INDUSTRIES, LTD., Osaka (JP)

(72) Inventors: Shu Miura, Osaka (JP); Takashi Ono, Osaka (JP); Hiroshi Ebina, Osaka (JP); Eriko Watanabe, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 459 days.

(21) Appl. No.: 17/944,005

(22) Filed: Sep. 13, 2022

(65) Prior Publication Data

US 2023/0003400 A1 Jan. 5, 2023

Related U.S. Application Data

(63) Continuation of application No. PCT/JP2021/004575, filed on Feb. 8, 2021.

(30) Foreign Application Priority Data

Mar. 16, 2020 (JP) ................. 2020-044955

(51) Int. Cl.
*B01D 53/04* (2006.01)
*B01D 53/26* (2006.01)
*F24F 3/14* (2006.01)

(52) U.S. Cl.
CPC ........ *F24F 3/1411* (2013.01); *B01D 53/0438* (2013.01); *B01D 53/0446* (2013.01);
(Continued)

(58) Field of Classification Search
CPC ............. F24F 3/1411; F24F 2003/1458; F24F 2203/1068; F24F 3/1423;
(Continued)

(56) References Cited

U.S. PATENT DOCUMENTS 6,247,323 B1* 6/2001 Maeda ............... F24F 5/001
62/271
2003/0074913 A1* 4/2003 Ebara ............... F24F 1/0038
62/271
(Continued)

FOREIGN PATENT DOCUMENTS

JP 2006-170492 A 6/2006
JP 2008-190828 A 8/2008

OTHER PUBLICATIONS

European Search Report of corresponding EP Application No. 21 77 1336.1 dated Jul. 21, 2023.
(Continued)

*Primary Examiner* — Frank M Lawrence, Jr.
(74) *Attorney, Agent, or Firm* — GLOBAL IP COUNSELORS, LLP

(57) ABSTRACT

A humidifying unit humidifies a target space, and includes an adsorption member having moisture adsorption and release areas, a heater that heats the moisture release area, fans to generate an air flow, a housing, an electric component including a heat generating component, and a cooler to air-cool the heat generating component. The housing accommodates the adsorption member, the heater, and the fans. The housing has a humidifying air path through which air taken from outside the housing by the fans is discharged outside the housing via the adsorption member, and a cooling air path in which the cooler is disposed and air taken from outside the housing by the fans is joined with the humidifying air path. A route of air passing through the humidifying air path from the cooling air path and being discharged outside the housing does not pass through the moisture adsorption area of the adsorption member.

12 Claims, 12 Drawing Sheets

(52) U.S. Cl.
CPC ........ *B01D 53/261* (2013.01); *B01D 2257/80* (2013.01); *B01D 2259/40096* (2013.01); *F24F 2003/1458* (2013.01)

(58) Field of Classification Search
CPC ....... F24F 2003/1464; F24F 2203/1032; F24F 2203/1056; F24F 2203/1088; B01D 53/0438; B01D 53/0446; B01D 53/261; B01D 53/04; B01D 2257/80; B01D 2259/40096
USPC .... 96/125, 126, 146; 95/113, 117, 121, 126; 34/80, 472, 473
See application file for complete search history.

(56) References Cited

U.S. PATENT DOCUMENTS

2014/0157806 A1\* 6/2014 Ito ........................... F24F 11/30
62/158
2024/0219043 A1\* 7/2024 Kizawa .............. B01J 20/28023

OTHER PUBLICATIONS

International Preliminary Report of corresponding PCT Application No. PCT/JP2021/004575 dated Sep. 20, 2022.
International Search Report of corresponding PCT Application No. PCT/JP2021/004575 dated Apr. 27, 2021.

\* cited by examiner

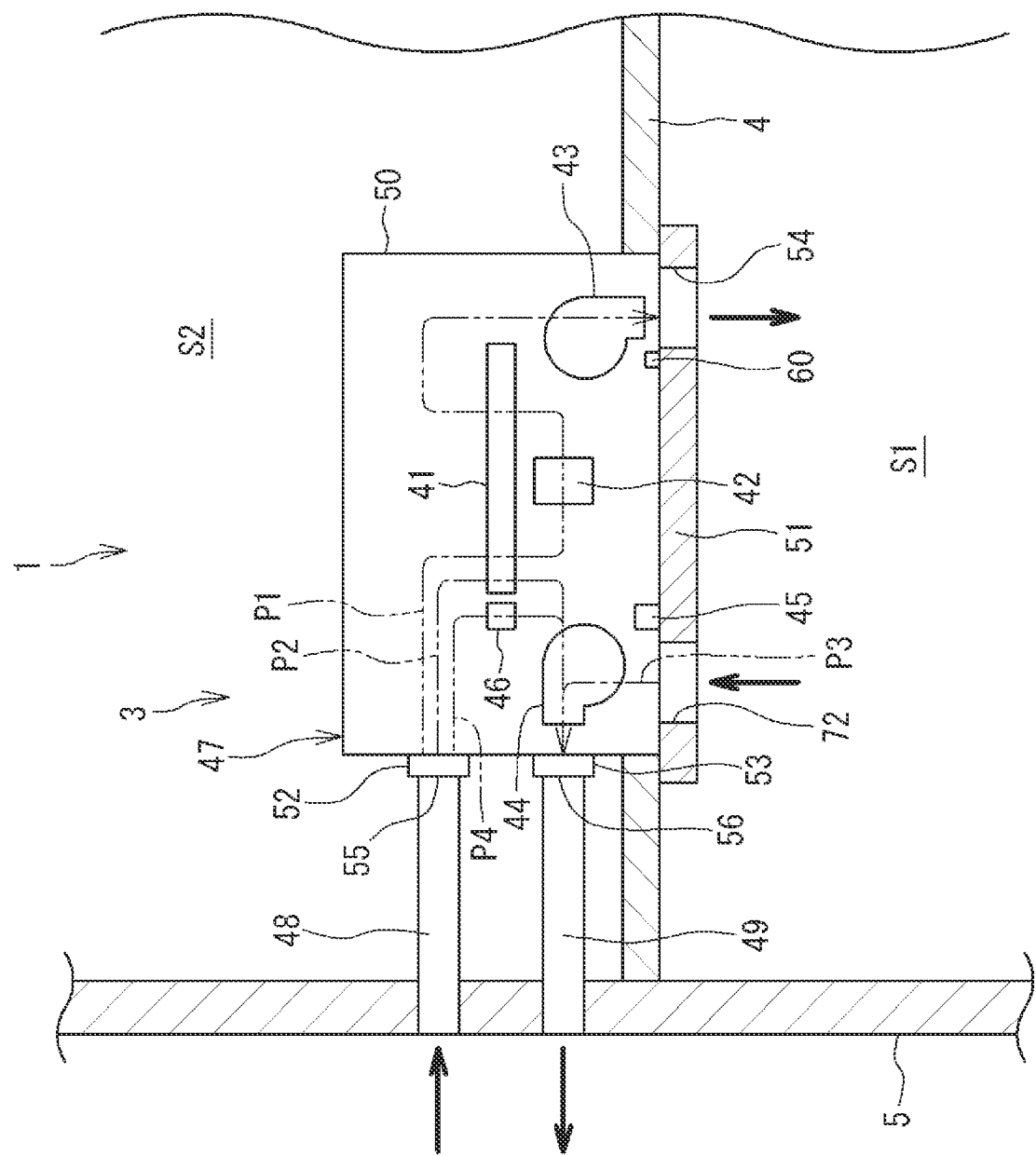
F I G. 1

FIG. 2
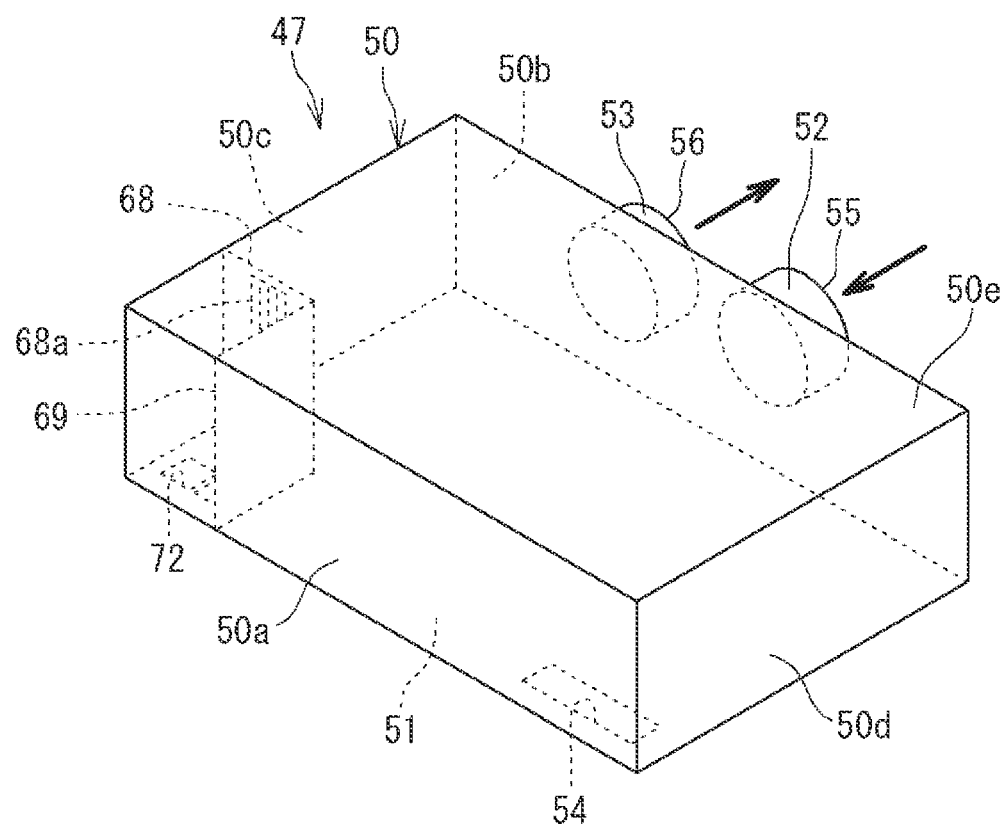
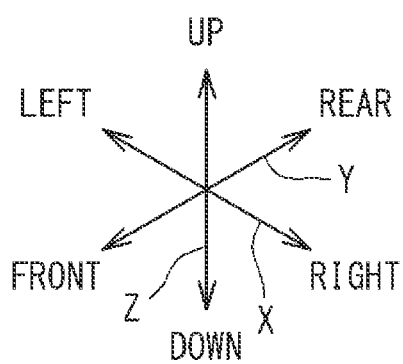

HUMIDIFYING UNIT

CROSS-REFERENCE TO RELATED APPLICATIONS

This is a continuation of International Application No. PCT/JP2021/004575 filed on Feb. 8, 2021, which claims priority to Japanese Patent Application No. 2020-044955, filed on Mar. 16, 2020. The entire disclosures of these applications are incorporated by reference herein.

BACKGROUND

Technical Field

The present disclosure relates to a humidifying unit.

Background Art

Japanese Laid-Open Patent Publication No. 2006-170492 discloses a humidity control device that humidifies the interior of a room. The humidity control device includes a housing accommodating a heater, a humidity control member and a fan. The housing is formed with a first flow path that discharges air introduced from outside by the fan to the outside, and a second flow path that supplies the interior of a room with air introduced from the outside by the fan. The air flowing through the first flow path is discharged to the outside after moisture in the air is adsorbed to the humidity control member. The air flowing through the second flow path is supplied to the interior of a room after the air is heated by the heater and humidified by the humidity control member.

SUMMARY

The present disclosure provides a humidifying unit configured to humidify a target space. The humidifying unit includes an adsorption member, a heater, fans configured to generate an air flow, a housing, an electric component including a heat generating component, and a cooler configured to air-cool the heat generating component. The adsorption member has a moisture adsorption area configured to adsorb moisture and a moisture release area configured to release moisture. The heater is configured to heat the moisture release area of the adsorption member. The housing accommodates the adsorption member, the heater, and the fans. The housing has a humidifying air path through which air taken from outside the housing by the fans is discharged outside the housing via the adsorption member, and a cooling air path in which the cooler is disposed and air taken from outside the housing by the fans is joined with the humidifying air path. A route of air passing through the humidifying air path from the cooling air path and being discharged outside the housing does not pass through the moisture adsorption area of the adsorption member.

BRIEF DESCRIPTION OF THE DRAWINGS

FIG. 1 is a schematic diagram of a humidifying unit according to an embodiment of the present disclosure.

FIG. 2 is an external perspective view of a housing of the humidifying unit.

DETAILED DESCRIPTION OF EMBODIMENT(S)

Figure 3:
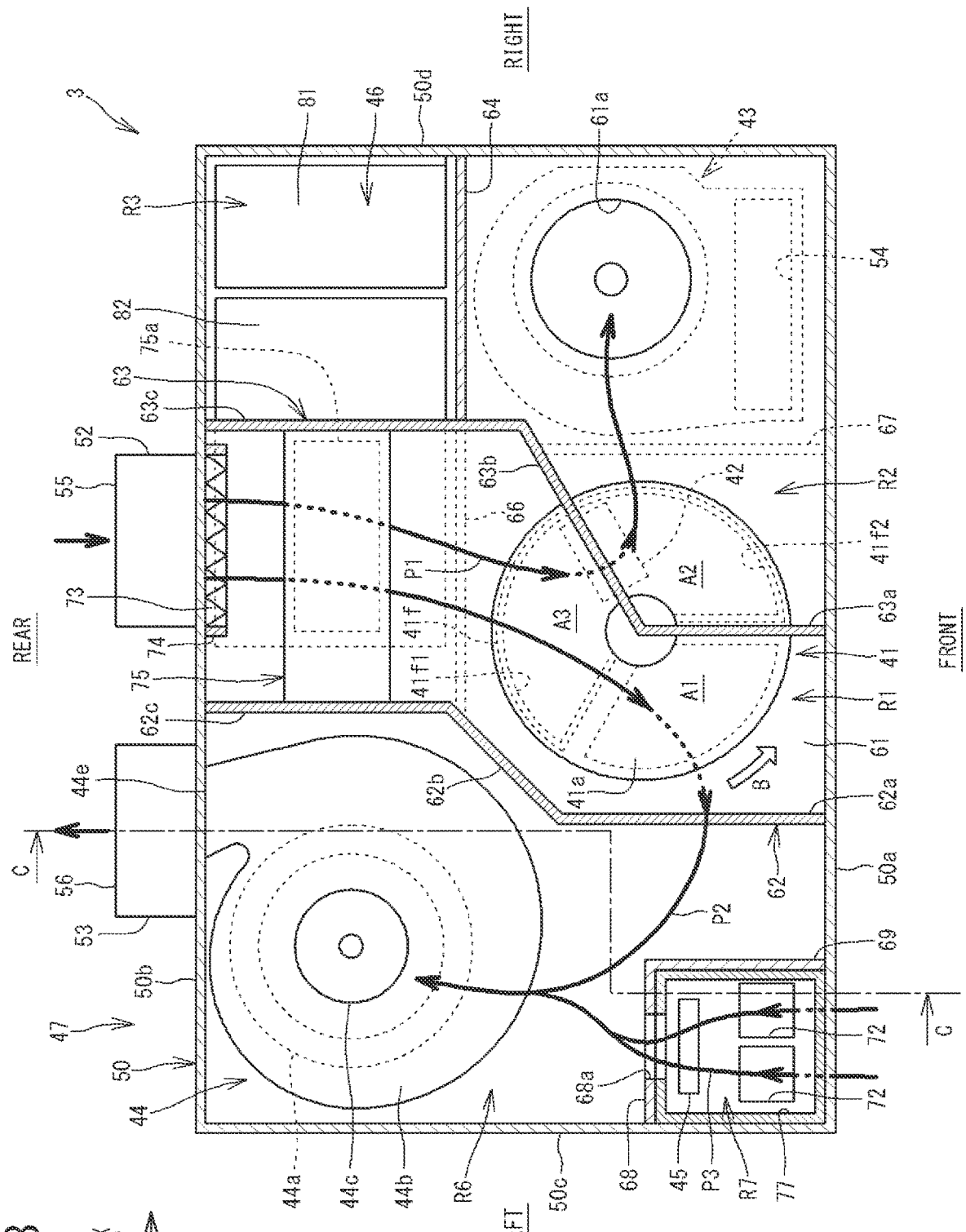
FIG. 3 is a schematic plan view of the housing with a top panel removed.

Embodiments will be described below with reference to the accompanying drawings.

Overall Configuration of Humidifying Unit

FIG. 1 is a schematic diagram of a humidifying unit 3 according to an embodiment of the present disclosure.

The humidifying unit 3 humidifies and ventilates a target space S1. The target space S1 is, for example, a space in a room partitioned by a ceiling wall 4, a side wall 5, and a floor wall (not illustrated).

The humidifying unit 3 introduces and humidifies outdoor air, and blows out the humidified air to the target space S1. The humidifying unit 3 includes a moisture adsorption rotor 41, a heater 42, a first fan 43, a second fan 44, a temperature and humidity sensor 45, a controller 46, a housing 47, an introduction duct 48, and a discharge duct 49.

The housing 47 accommodates the aforementioned devices 41 to 46. The housing 47 has a housing body 50, a panel 51, an introduction connection pipe 52, and a discharge connection pipe 53. The most part of the housing body 50 is disposed in an attic space S2. The lower end part of the housing body 50 is disposed to penetrate the ceiling wall 4. The attic space S2 is a space formed above the ceiling wall 4. The lower end of the housing body 50 is open, and closed by the panel 51.

The panel 51 is removably attached to the lower end of the housing body 50, The lower surface of the panel 51 is entirely exposed to the target space S1. The panel 51 is formed with a plurality of openings 54, 72 that connect the interior of the housing body 50 and the target space S1. The openings include a blow-out port 54 for blowing out air from the housing body 50 to the target space S1. A temperature sensor 60 that detects temperature of the air to be blown out from the blow-out port 54 is provided near the blow-out port 54. The openings include an inflow port 72 for flowing the air inside the target space S1 into the housing body 50. The temperature and humidity sensor 45 that detects temperature and humidity of the air of the target space S1 flown from the inflow port 72 is provided near the inflow port 72.

One end of the introduction connection pipe 52 and one end of the discharge connection pipe 53 are connected with the housing body 50. An opening on the other end side of the introduction connection pipe 52 is an intake port 55 for taking outdoor air in. An opening on the other end side of the discharge connection pipe 53 is a discharge port 56 for discharging air to the outside. The intake port 55 and the discharge port 56 may be configured by an opening formed in the wall surface of the housing body 50 without using the introduction connection pipe 52 and the discharge connection pipe 53.

The housing 47 has a first air path P1 and a second air path P2. The first air path P1 and the second air path P2 are "a humidifying air path" for use for humidification of the target space S1. The outdoor air introduced into the housing 47 from the intake port 55 passes through the first air path P1 and flows to the blow-out port 54. The outdoor air introduced into the housing 47 from the intake port 55 passes through the second air path P2 and flows to the discharge port 56.

The housing 47 further has a third air path P3 and a fourth air path P4.

The third air path P3 is a "condition-detecting air path" for use for detecting temperature and humidity that are the conditions of the air in the target space S1. The air in the target space S1 flown into the housing 47 from the inflow port 72 flows through the third air path P3. The third air path P3 joins the second air path P2. The air flowing through the third air path P3 is discharged from the discharge port 56 together with the air flowing through the second air path P2.

The fourth air path P4 is a "cooling air path" for use for cooling a heat generating component included in the controller 46. The outdoor air introduced into the housing 47 from the intake port 55 flows through the fourth air path P4. The fourth air path P4 cools the heat generating component, and then joins the second air path P2. The air flowing through the fourth air path P4 is discharged from the discharge port 56 together with the air flowing through the second air path P2.

One end of the introduction duct 48 is connected with the introduction connection pipe 52 of the housing 47. The other end of the introduction duct 48 penetrates the side wall 5 and communicates with the outside. The introduction duct 48 of the present embodiment serves as a first introduction duct for introducing outdoor air into the first air path P1 from the intake port 55, a second introduction duct for introducing outdoor air into the second air path P2 from the intake port 55, and a fourth introduction duct for introducing outdoor air into the fourth air path P4.

One end of the discharge duct 49 is connected with the discharge connection pipe 53 of the housing 47. The other end of the discharge duct 49 penetrates the side wall 5 and communicates with the outside. The air flowing through the second air path P2 is discharged to the outside from the discharge port 56 via the discharge duct 49.

The moisture adsorption rotor (adsorption device) 41 is disposed in a midway of the first air path P t and the second air path P2. The moisture adsorption rotor 41 is configured to remove moisture from the air flowing through the second air path P2 and release the moisture to the air flowing through the first air path P1. The heater 42 is provided in a midway of the first air path P1, and heats air before humidification flowing through the first air path P1.

The first fan 43 is disposed near the blow-out port 54 in the first air path P1. The first fan 43 generates an air flow in the first air path P1. To be more specific, the first fan 43 is disposed at a position capable of introducing outdoor air into the first air path P1 via the introduction duct 48, and blowing out the air to the target space S1 from the blow-out port 54 via the moisture adsorption rotor 41.

The second fan 44 is disposed near the discharge port 56 in the second air path P2. The second fan 44 generates an air flow in the second air path P2. To be more specific, the second fan 44 is disposed at a position capable of introducing outdoor air into the second air path P2 via the introduction duct 48, and discharging the air to the outside from the discharge port 56 via the moisture adsorption rotor 41. The second fan 44 also generates an air flow in the third air path P3 and the fourth air path P4.

The temperature and humidity sensor 45 is provided in the housing body 50, and detects temperature and humidity of the air in the target space S1. The temperature sensor 60 is provided in the housing body 50, and detects temperature of the air to be blown out to the target space S1. Detection values of the temperature and humidity sensor 45 and the temperature sensor 60 are input to the controller 46. The first fan 43 and the second fan 44 are provided with a rotation detecting sensor (omitted in the drawing) such as an encoder, and a detection value of the rotation detecting sensor is also input to the controller 46. The controller 46 controls operations of the moisture adsorption rotor 41, the heater 42, the first fan 43, and the second fan 44 on the basis of detection values of various sensors 45 and 60 and the like.

The humidifying unit 3 performs "humidifying operation" and "ventilation operation". In the humidifying operation, the controller 46 actuates the moisture adsorption rotor 41, the heater 42, the first fan 43, and the second fan 44. As a result, outdoor air passes through the introduction duct 48 and is introduced into the first air path P1 and the second air path P2 of the housing body 50. Moisture in the air introduced into the second air path P2 is removed by the moisture adsorption rotor 41. The air from which moisture is removed passes through the discharge duct 49 and is discharged to the outside. The air introduced into the first air path P1 is humidified by the moisture adsorption rotor 41. The humidified air is blown out to the target space S1 from the blow-out port 54. The controller 46 performs the humidifying operation so that the humidity of the target space S1 detected by the temperature and humidity sensor 45 has a target humidity (set humidity).

In the ventilation operation, the controller 46 actuates the first fan 43 and the second fan 44, but does not actuate the moisture adsorption rotor 41 and the heater 42. As a result, outdoor air passes through the introduction duct 48 and is introduced into the first air path P1 and the second air path P2 of the housing body 50. The air introduced into the first air path P1 is blown out to the target space S1 from the blow-out port 54 without being humidified by the moisture adsorption rotor 41.

In the humidifying operation and the ventilation operation, the air volume of the air to be blown out to the target space S1 from the blow-out port 54 is set to be larger than the air volume of the air to be discharged to the outside from the target space S1 through the inflow port 72 and the third air path P3. Therefore, the interior of the target space S1 has a positive pressure by the air released from the blow-out port 54. As a result, the air in the target space S1 leaks outside the target space S1 from a location other than the humidifying unit 3, and the target space S1 can be ventilated. Therefore, the humidifying unit 3 of the present embodiment is a humidifying unit of the type that pushes outdoor air into the target space S1 (outdoor air pushing type).

Specific Configuration of Housing 47

FIG. 2 is an external perspective view of the housing 47 of the humidifying unit 3. The following description may include expressions such as "up", "down", "left", "right", "front", and "rear", for indication of directions and positions. These expressions follow the directions of arrows X, Y, Z shown in FIG. 2 that are orthogonal to each other unless otherwise noted. Specifically, the following description assumes that a direction indicated by arrow X (first direction) in FIG. 2 is a lateral direction, a direction indicated by arrow Y (second direction) is a front-rear direction, and a direction indicated by arrow Z (third direction) is a vertical direction. These expressions indicating directions and positions are used for convenience of description, and will not limit the present disclosure.

The housing body 50 of the housing 47 has a rectangular parallelepiped shape. The housing body 50 has a front panel 50*a*, a rear panel 50*b*, a left-side panel 50*c*, a right-side panel 50*d*, and a top panel 50*e*. The lower end of the housing body 50 is open, and closed by the panel 51.

The rear panel 50*b* of the housing body 50 is provided with the introduction connection pipe 52 and the discharge connection pipe 53. The housing body 50 has a lamer length in the direction in which air exits or enters through the introduction connection pipe 52 and the discharge connection pipe 53 (front-rear direction Y) than the length in the direction that is horizontally orthogonal to the front-rear direction (lateral direction X). The panel 51 is formed with the blow-out port 54 and the inflow port 72. In the lateral direction X, the blow-out port 54 is disposed on one side part of the panel 51, and the inflow port 72 is disposed on the other side part, of the panel 51. Therefore, the blow-out port 54 and the inflow port 72 are disposed at an interval in the lateral direction X.

Figure 4:
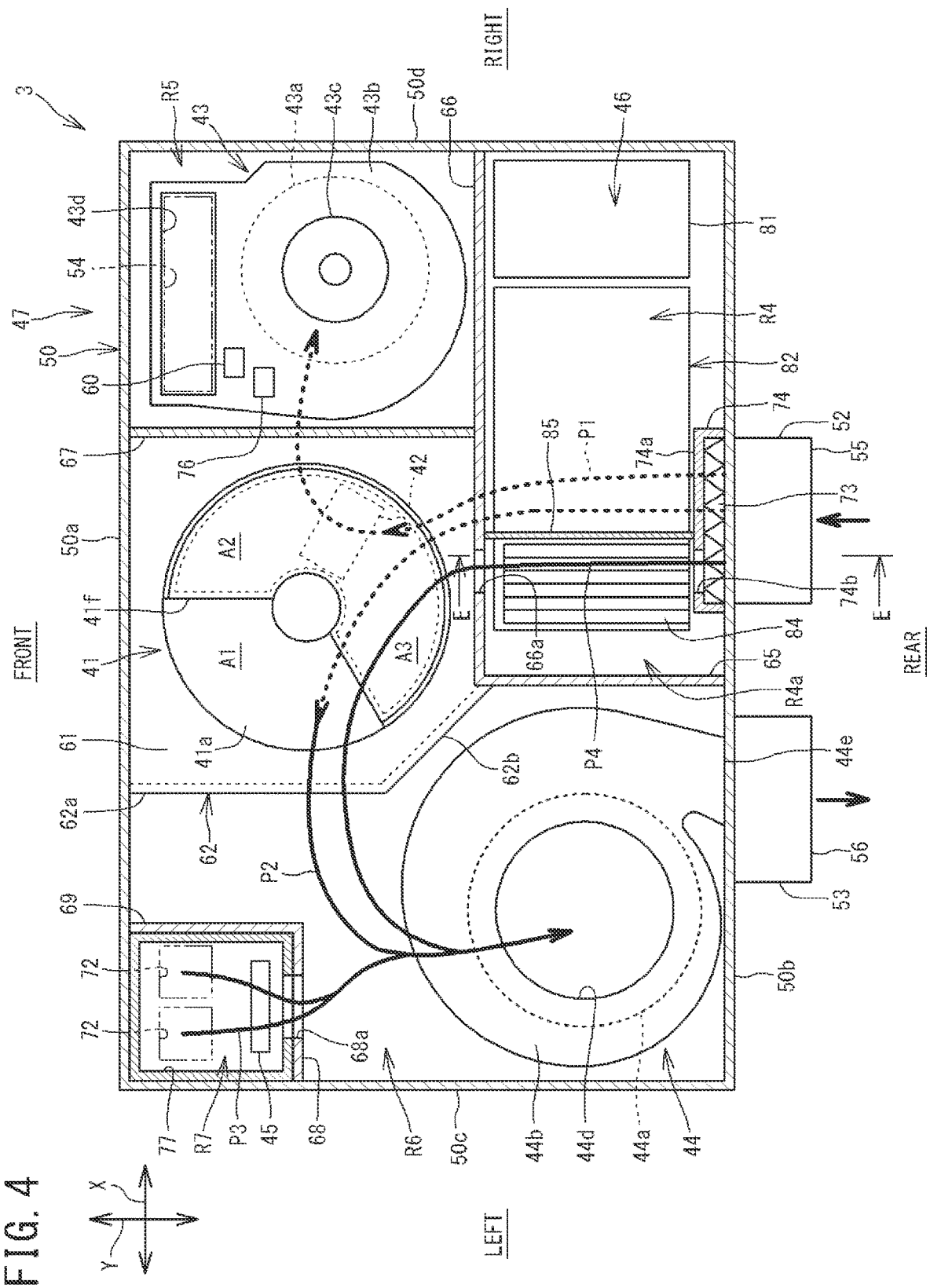
FIG. 4 is a schematic bottom view of the housing with a panel removed.
Figure 5:
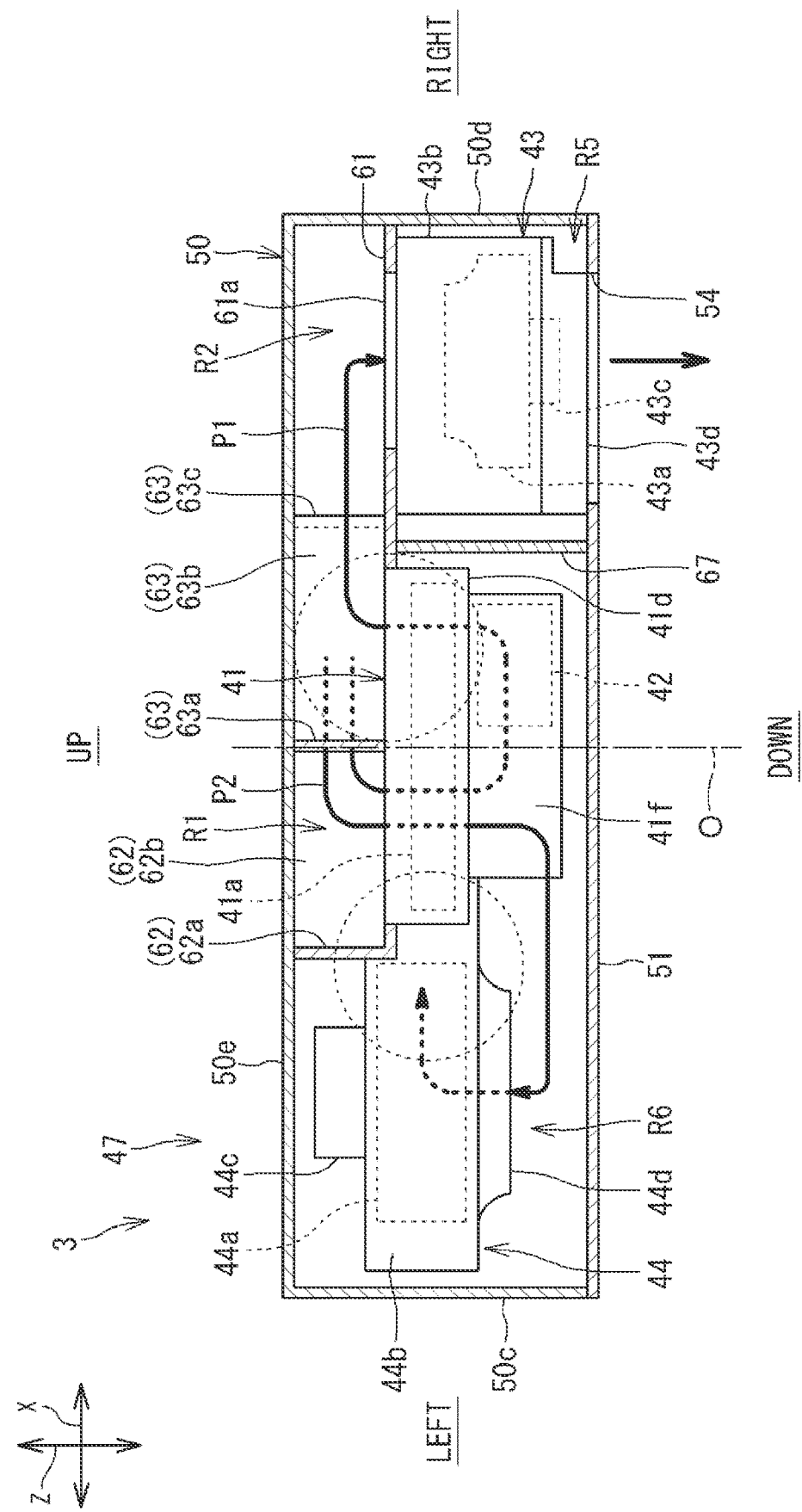
FIG. 5 is a schematic front view of the housing with a front panel removed.

FIG. 3 is a schematic plan view of the housing 47 with the top panel 50*e* removed. FIG. 4 is a schematic bottom view of the housing 47 with the panel 51 removed. FIG. 5 is a schematic front view of the housing 47 with the front panel 50*a* removed. As shown in FIG. 3 to FIG. 5, inside the housing 47, devices such as the moisture adsorption rotor 41, the first fan 43, and the second fan 44 are disposed to be distributed in the lateral direction X.

The housing body 50 is provided with a first partition plate 61 that vertically partitions the internal space. As shown in FIG. 3 and FIG. 5, on the first partition plate 61, a second partition plate 62, a third partition plate 63, and a fourth partition plate 64 are provided. As shown in FIG. 4 and FIG. 5, a fifth partition plate 65, a sixth partition plate 66, and a seventh partition plate 67 are provided below the first partition plate 61.

As shown in FIG. 3, the first partition plate 61 is provided in an area surrounded by the second and the third partition plates 62 and 63 and in an area surrounded by the third and the fourth partition plates 63 and 64 (the area excluding the area where the second fan 44 is disposed and the area where part of the controller 46 is disposed) in plan view in FIG. 3. In the area where the second fan 44 is disposed, an eighth partition plate 68 and a ninth partition plate 69 are provided.

As shown in FIG. 3, the second partition plate 62 has two vertical plates 62*a* and 62*c* extending in the front-rear direction Yin plan view, and an inclined plate 62*b* connecting the vertical plates 62*a* and 62*c*. The vertical plate 62*a* extends rearward from the front panel 50*a* of the housing body 50. The vertical plate 62*c* extends forward from the rear panel Sob of the housing body 50. The vertical plate 62*a* and the vertical plate 62*c* are shifted in position in the lateral direction X. The inclined plate 62*b* connects the rear end of the vertical plate 62*a* and the front end of the vertical plate 62*c*.

The third partition plate 63 is disposed at an interval in the lateral direction X with respect to the second partition plate 62. The third partition plate 63 has two vertical plates 63*a* and 63*c* extending in the front-rear direction Y in plan view, and an inclined plate 63*b* connecting the vertical plates 63*a* and 63*c*. The vertical plate 63*a* extends rearward from the front panel 50*a* of the housing body 50. The vertical plate 63*c* extends forward from the rear panel 50*b* of the housing body 50. The vertical plate 63*a* and the vertical plate 63*c* are shifted in position in the lateral direction X. The inclined plate 63*b* connects the rear end of the vertical plate 63*a* and the front end of the vertical plate 63*c*.

The fourth partition plate 64 extends in the lateral direction X to bridge a midway part in the front-rear direction Y of the vertical plate 63*c* in the third partition plate 63, and the right-side panel 50*d* of the housing body 50.

By the configuration as described above, a first space R1 that spans in the front-rear direction Y of the housing body 50 is formed by the second partition plate 62 and the third partition plate 63, in the upper side and in approximately the center in the lateral direction X of the housing body 50. In the right front side in the upper side of the housing body 50, a second space R2 is formed by the third partition plate 63 and the fourth partition plate 64. In the right rear side in the upper side of the housing body 50, a third space R3 is armed by the vertical plate 63*c* of the third partition plate 63 and the fourth partition plate 64.

As shown in FIG. 4, the fifth partition plate 65 disposed in the lower side of the first partition plate 61 extends forward from the rear panel 50*b* of the housing body 50. The fifth partition plate 65 is disposed below the vertical plate 62*c* (see FIG. 3) in the second partition plate 62. The sixth partition plate 66 extends in the lateral direction X to bridge the front end of the fifth partition plate 65 and the right-side panel 50*d* of the housing body 50. The seventh partition plate 67 extends in the front-rear direction Y to bridge a midway part in the lateral direction X of the sixth partition plate 66 and the front panel 50*a* of the housing body 50.

By the configuration described above, a fourth space R4 is formed by the fifth partition plate 65 and the sixth partition plate 66 in the right rear side in the lower side of the housing body 50. In the right front side in the lower side of the housing body 50, a fifth space R5 is formed by the sixth partition plate 66 and the seventh partition plate 67.

The first partition plate 61 does not exist between the third space R3 shown in FIG. 3 and the fourth space R4 shown in FIG. 4. Therefore, the third space R3 and the fourth space R4 vertically communicate with each other. In the third space R3 and the fourth space R4, electric components including the controller 46 are disposed. In the fifth space R5, the first fan 43 is disposed.

In the housing body 50, the area on the left of the second partition plate 62 as shown in FIG. 3, and the area on the left of the fifth partition plate 65 and the seventh partition plate 67 as shown in FIG. 4 continuously connect with each other to form a sixth space R6. In the sixth space R6, the second fan 44 is disposed. The sixth space R6 forms part of the second air path P2 (see FIG. 1) through which air flows by the second fan 44.

As shown in FIG. 3 and FIG. 4, the eighth partition plate 68 extends in the right direction from the left-side panel 50*c* of the housing body 50. The ninth partition plate 69 extends in the front-rear direction Y to bridge the right end of the eighth partition plate 68 and the front panel 50*a*. The upper ends of the eighth partition plate 68 and the ninth partition plate 69 are connected with the top panel 50*e* of the housing body 50. The lower ends of the eighth partition plate 68 and the ninth partition plate 69 reach the panel 51.

The housing body 50 is formed with the seventh space R7 partitioned by the eighth partition plate 68 and the ninth partition plate 69. The seventh space R7 is a space partitioned into a quadrangle in plan view from the upper end to the lower end of the housing body 50. The inner face or the outer face of the seventh space R7 is provided with a heat insulating material 77. The heat insulating material 77 prevents heat transfer with the neighboring second space R2.

The configuration of dividing the internal space of the housing body 50 is not limited to the present embodiment, but may be appropriately modified.

As shown in FIG. 3 and FIG. 4, the introduction connection pipe 52 is provided at a position corresponding to the first space R1 and the fourth space R4 in the rear panel 50b of the housing body 50. The intake port 55 of the introduction connection pipe 52 communicates with the first space R1 and the fourth space R4. The first space R1 forms the first air path P1 (see FIG. 1) and part of the second air path P2 through which air taken from the intake port 55 flows. The fourth space R4 forms the fourth air path P4 (see FIG. 1) through which air taken from the intake port 55 flows. The second space R2 communicates with the first space R1 via a later-described heater case 41f of the moisture adsorption rotor 41, and forms the first air path P1 together with the first space R1.

The inner face of the rear panel 50b of the housing body 50 is provided with an air filter 73 that removes dust and the like from air taken into the housing body 50 from the intake port 55. The air filter 73 is attached to an attachment frame 74 provided on the rear panel 50b. As shown in FIG. 3, the first space R1 is provided with a damper device 75 that is switchable between the mode of allowing passage of air taken from the intake port 55, and the mode of inhibiting passage of the air. The damper device 75 has a door 75a that opens or closes the first and the second air paths P1 and P2 by rotational movement.

The discharge connection pipe 53 is provided at a position corresponding to the sixth space R6 in the rear panel 50b of the housing body 50. The discharge port 56 of the discharge connection pipe 53 communicates with the sixth space R6. The sixth space R6 communicates with the first space R1 via a later-described adsorption member 41a of the moisture adsorption rotor 41, and forms the second air path P2 together with the first space R1.

As shown in FIG. 4 and FIG. 5, the blow-out port 54 formed in the panel 51 is formed at a position corresponding to the fifth space R5. As shown in FIG. 3 and FIG. 4, the inflow port 72 formed in the panel 51 is formed at a position corresponding to the seventh space R7. The seventh space R7 forms the third air path P3 (see FIG. 1).

Figure 6:
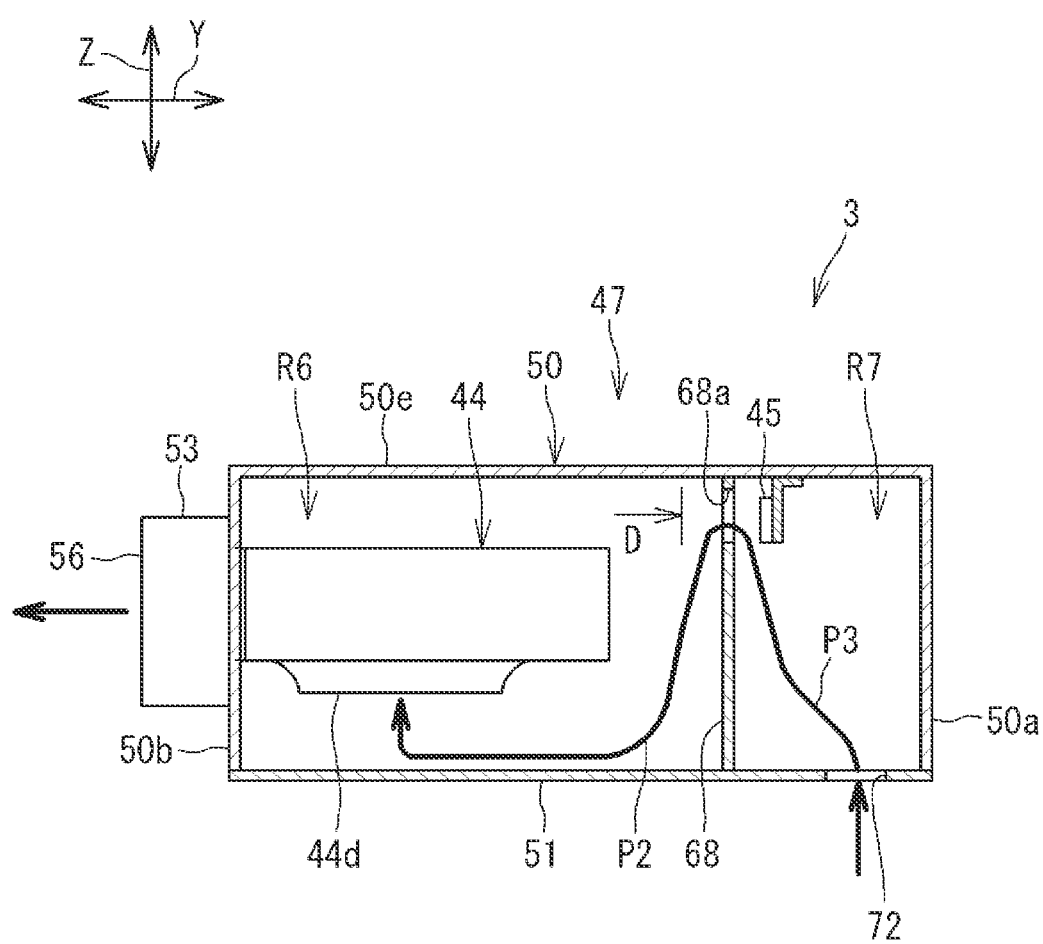
FIG. 6 is a schematic cross-sectional view taken along the arrowed line C-C in FIG. 3.
Figure 7:
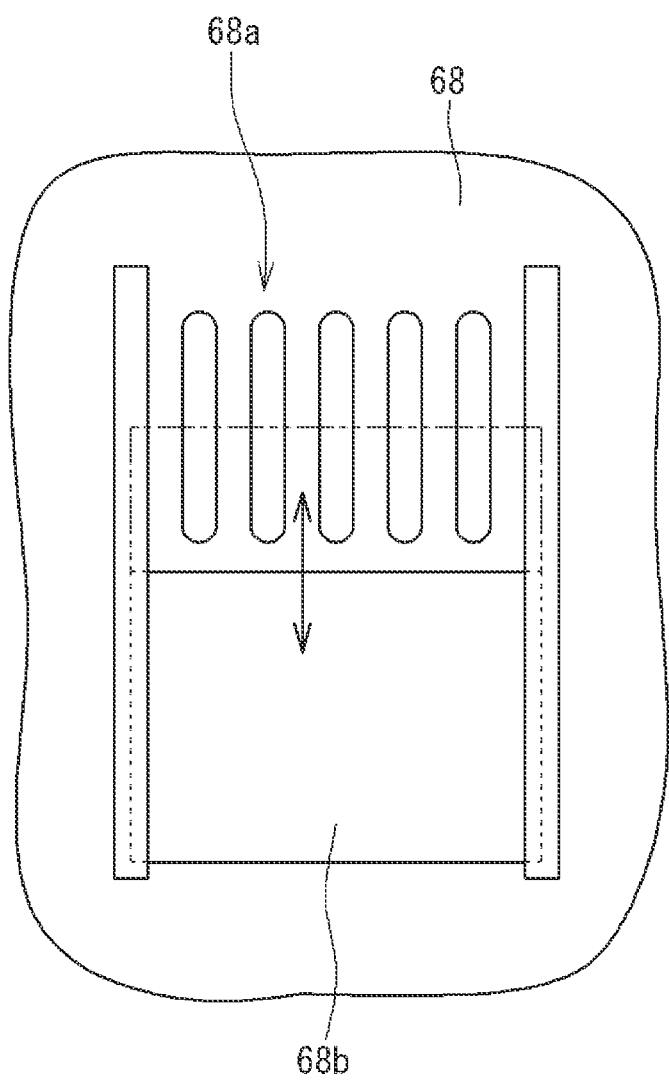
FIG. 7 is a fragmentary view in the direction of arrow D in FIG. 6.

FIG. 6 is a schematic cross-sectional view taken along the arrowed line C-C in FIG. 3. FIG. 7 is a fragmentary view in the direction of arrow D in FIG. 6. As shown in FIG. 3, FIG. 4, and FIG. 6, the eighth partition plate 68 forming the seventh space R7 is formed with an opening 68a. The opening 68a communicates with the seventh space R7 and the sixth space R6. The opening 68a constitutes a junction port for joining the third air path P3 with the second air path P2. As shown in FIG. 7, the opening 68a of the present embodiment is made up of a plurality of slits that are elongated in the vertical direction Z. The plurality of slits are arranged in the lateral direction X. The area of the opening 68a is smaller than the area of the inflow port 72.

In the seventh space R7, the temperature and humidity sensor 45 is disposed. The temperature and humidity sensor 45 detects temperature and humidity of the air flowing through the opening 68a from the inflow port 72. As shown in FIG. 6, the temperature and humidity sensor 45 is disposed to face with the opening 68a in the seventh space R7. Therefore, it is possible to appropriately detect temperature and humidity of the air passing through the opening 68a.

As shown in FIG. 7, the eighth partition plate 68 is provided with an adjustment plate 68b for adjusting the area of the opening 68a. The adjustment plate 68b of the present embodiment is attached to the eighth partition plate 68 in a vertically movable manner. The length of the adjustment plate 68b overlapping the opening 68a is varied by moving the adjustment plate 68b in the vertical direction, and thus the area of the opening 68a connecting the seventh space R7 and the sixth space R6 can be adjusted. By adjusting the area of the opening 68a, it is possible to regulate the air volume of the air flow flowing into the seventh space R7. Movement of the adjustment plate 68b may be conducted manually, or may be conducted automatically with an actuator such as a motor, solenoid or the like. The adjustment plate 68b may be provided in a laterally movable manner.

Configuration of Controller 46

As shown in FIG. 3 and FIG. 4, the controller 46 is disposed in the third space R3 and the fourth space R4. The controller 46 includes a first control board 81 and a second control board 82. The first control board 81 controls the operation of the first fan 43. The second control board 82 controls the operation of the second fan 44 and the heater 42. On the first and second control boards 81 and 82, a microcomputer having CPU and memory and so on, and an inverter (power circuit) having a rectifier circuit and an inverter circuit and so on are mounted.

On the second control board 82, a heat generating component such as a switching element included in an inverter is mounted. As shown in FIG. 4, a heat sink (cooler) 84 for cooling the heat generating component is attached to the second control board 82. The heat sink 84 is composed of a block formed of an aluminum alloy or the like, and is formed with a large number of fins on the surface. The heat sink 84 is located near the front side of the introduction connection pipe 52. In the fourth space R4 where the controller 46 is disposed, a partition wall 85 that partitions the area where the heat sink 84 is disposed (cooling space) R4a off the remaining area is disposed along the front-rear direction Y. The cooling space R4a forms the fourth air path P4 (see FIG. 1).

Figure 8:
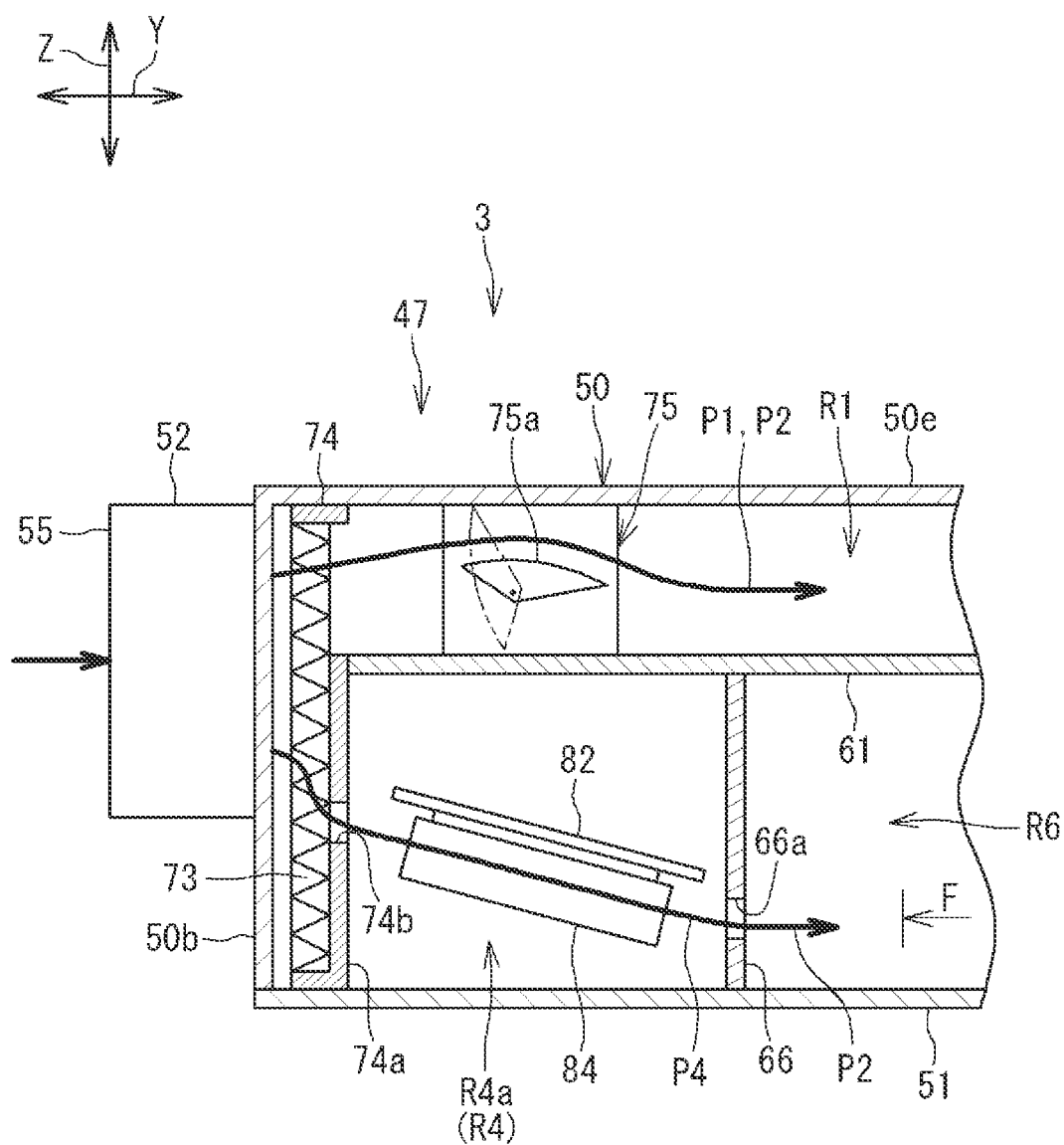
FIG. 8 is a schematic cross-sectional view taken along the arrowed line E-E in FIG. 4.

FIG. 8 is a schematic cross-sectional view taken along the arrowed line E-E in FIG. 4.

As shown in FIG. 4 and FIG. 8, the attachment frame 74 to which the air filter 73 is attached has a shielding plate 74a that blocks circulation of air below the first partition plate 61. The shielding plate 74a is formed with an inflow port 74h through which air taken from the intake port 55 flows into the cooling space R4a.

The sixth partition plate 66 is formed with an opening 66a. The opening 66a connects the cooling space R4a and the sixth space R6. Since the sixth space R6 forms the second air path P2, the opening 66a constitutes a junction port for joining the fourth air path P4 with the second air path P2. Therefore, air taken from the intake port 55 flows in the cooling space R4a from the inflow port 74b, and is discharged to the sixth space R6 from the opening 66a. The heat sink 84 disposed in the cooling space R4a is supplied with air flowing in the cooling space R4a, and the heat generating component mounted on the second control board 82 is cooled.

Figure 9:
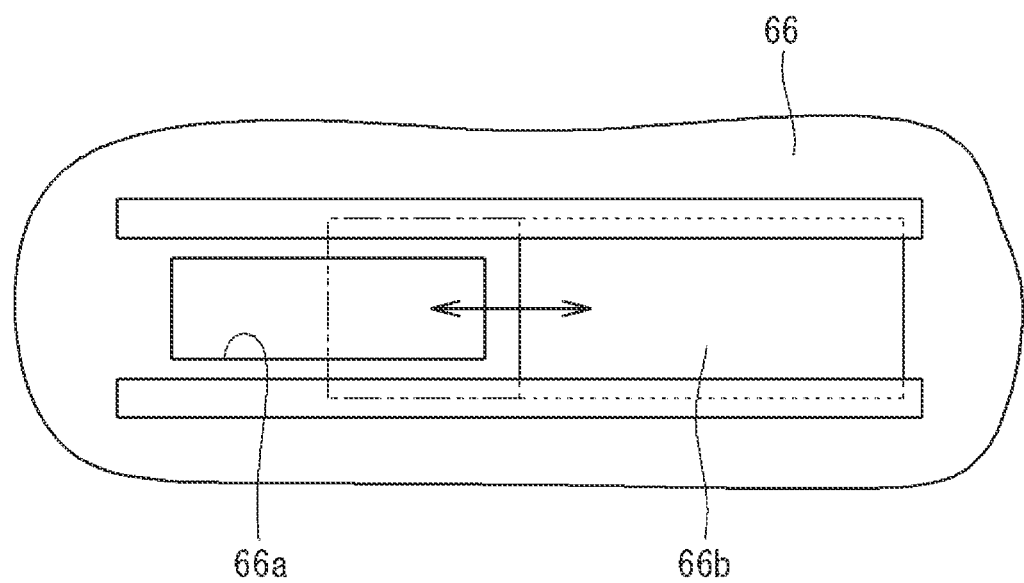
FIG. 9 is a fragmentary view in the direction of arrow F in FIG. 8.

FIG. 9 is a fragmentary view in the direction of arrow F in FIG. 8.

The sixth partition plate 66 is provided with an adjustment plate 66b for adjusting the area of the opening 66a. The adjustment plate 66b of the present embodiment is attached to the sixth partition plate 66 in a laterally movable manner. The length of the adjustment plate 66b overlapping the opening 66a is varied by moving the adjustment plate 66b in the lateral direction, and thus the area of the opening 66a communicating between the cooling space R4a and the sixth space R6 can be adjusted. By adjusting the area of the opening 66a, it is possible to regulate the air volume of the air flowing into the fourth space R4. Movement of the adjustment plate 66b may be conducted manually, or may be conducted automatically with an actuator such as a motor, solenoid or the like. The adjustment plate 66b may be provided in a vertically movable manner.

Configuration of First Fan 43

As shown in FIG. 5, in the fifth space R5, the first fan 43 is provided below the first partition plate 61. The first fan 43 has a fan body 43a having a plurality of blades, a fan case 43b that accommodates the fan body 43a, and a fan motor 43c that rotates the fan body 43a. The first fan 43 of the present embodiment is, for example, a centrifugal fan.

The first partition plate 61 is formed with a suction port 61a through which air is sucked into the fan case 43b by rotation of the fan body 43a. The lower end of the fan case 43b is formed with an ejection port 43d through which air is ejected outside the fan case 43b by rotation of the fan body 43a. The ejection port 43d is connected with the blow-out port 54 of the panel 51 and communicates with the blow-out port 54. An air flow of the first air path P1 is generated by the first fan 43.

As shown in FIG. 4, the fan case 43b of the first fan 43 is provided with the temperature sensor 60 and a temperature fuse (temperature detector) 76. The temperature sensor 60 detects temperature of the air to be, blown out from the ejection port 43d. The temperature fuse 76 has an electric wire that breaks when the temperature of ambient air exceeds a predetermined temperature, and is incorporated in a circuit that transmits a signal to the controller 46. The detection value of the temperature sensor 60, and the braking state of the temperature fuse 76 are input to the controller 46.

Configuration of Second Fan 44

As shown in FIG. 3 to FIG. 5, the sixth space R6 is provided with the second fan 44. The second fan 44 has a fan body 44a having a plurality of blades, a fan case 44b that accommodates the fan body 44a, and a fan motor 44c that rotates the fan body 44a. The lower face of the fan case 44b is formed with a suction port 44d through which air is sucked into the fan case 44b by rotation of the fan body 44a. The rear end of the fan case 44b is formed with an ejection port 44e through which air is ejected outside the fan case 44b by rotation of the fan body 44a. The ejection port 44e is connected with the discharge connection pipe 53. An air flow of the second air path P2 is generated by the second fan 44. The second fan 44 of the present embodiment is a sirocco fan. The second fan 44 generates an air flow having a larger air volume than the first fan 43.

Configuration of Moisture Adsorption Rotor 41

As shown in FIG. 3 to FIG. 5, the moisture adsorption rotor (moisture adsorption device) 41 is provided in the first partition plate 61. As shown in FIG. 3, the moisture adsorption rotor 41 is disposed below the inclined plate 63b and the vertical plate 63a of the third partition plate 63 in plan view. The moisture adsorption rotor 41 is disposed across the first space R1 and the second space R2. As shown in FIG. 4, the moisture adsorption rotor 41 is disposed in the sixth space R6 in bottom view.

Figure 10:
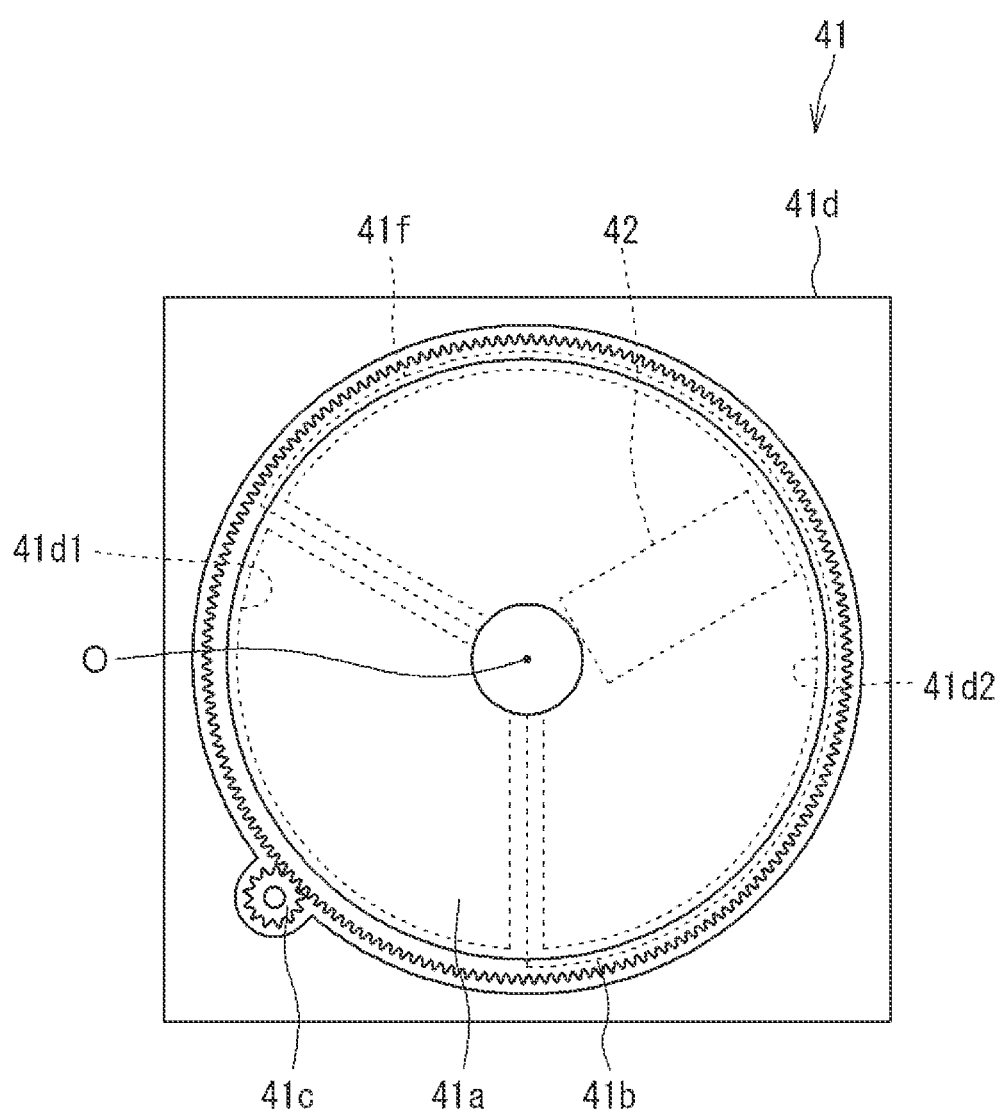
FIG. 10 is a plan view of a moisture adsorption rotor.
Figure 11:
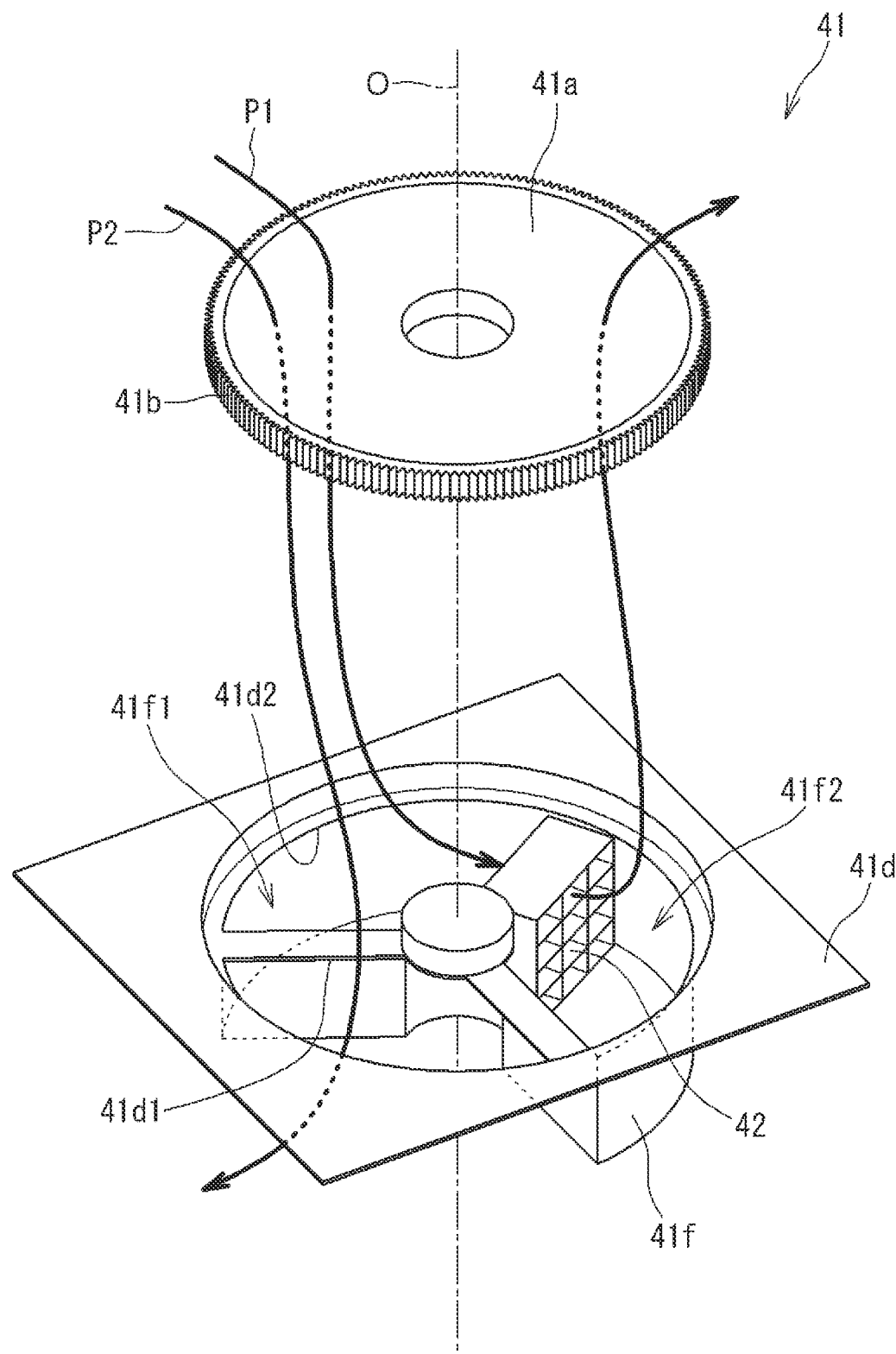
FIG. 11 is an exploded perspective view showing a moisture adsorption rotor.

FIG. 10 is a plan view of the moisture adsorption rotor 41. FIG. 11 is an exploded perspective view of the moisture adsorption rotor 41. The moisture adsorption rotor 41 has the adsorption member 41a, a ring gear 41b, a pinion gear 41c, a support frame 41d, and the heater case 41f. FIG. 11 shows the state that the adsorption member 41a is separated upward from the support frame 41d, and the ring gear 41b is omitted.

The adsorption member 41a is a desiccant material having an annular shape. When the temperature of the adsorption member 41a is low, the adsorption member 41a adsorbs moisture from air passing through the adsorption member 41a. When the temperature of the adsorption member 41a is high, the adsorption member 41a releases the moisture adsorbed thereto to air passing through the adsorption member 41a to humidify the air.

The ring gear 41b is composed of an external gear. The ring gear 41b is attached to the outer periphery of the adsorption member 41a. The adsorption member 41a and the ring gear 41b are integrated. The adsorption member 41a and the ring gear 41b are disposed in the support frame 41d. The adsorption member 41a and the ring gear 41b are supported in a rotatable manner by the support frame 41d at a center O of the adsorption member 41a.

The support frame 41d is formed integrally with the first partition plate 61 of the housing body 50, or fixed to the first partition plate 61. The support frame 41d is formed with approximately fan-shaped through-holes 41d1 and 41d2. The through-hole 41d1 is formed at a position corresponding to a later-described first area A1 (see FIG. 3). The through-hole 41d2 is formed at positions corresponding later-described second, third areas A2 and A3. The through-hole may be formed at three positions respectively corresponding to the first area A1 to the third area A3.

The pinion gear 41c is rotatably supported with respect to the support frame 41d on an outer periphery of the ring gear 41b. The pinion gear 41c meshes with the ring gear 41b. The pinion gear 41c is rotated by a motor (not illustrated). In response to the rotation of the pinion gear 41c, the adsorption member 41a rotates about the center O together with the ring gear 41b. In the present embodiment, the adsorption member 41a rotates in one circumferential direction (a direction indicated by an open arrow B in FIG. 3).

As shown in FIG. 4, FIG. 5 and FIG. 11, the support frame 41d of the moisture adsorption rotor 41 is provided with the heater case 41f. The heater case 41f is formed into an approximately circular arc shape in plan view, and is disposed at a position corresponding to the through-hole 41d2 of the support frame 41d. The heater case 41f is formed into a box shape with an open top end. As shown in FIG. 5, the heater case 41f is disposed below the adsorption member 41a in the sixth space R6. The heater case 41f is disposed within a range of later-described second area A2 and third area A3 (angular range of 240°) in plan view of FIG. 3. The heater case 41f functions as a path member that forms passage of air passing through the adsorption member 41a. The heater case 41f forms part of the first air path P1 between the first space R1 and the second space R2.

The heater case 41f accommodates the heater 42. As shown in FIG. 3, the heater 42 is located below the inclined plate 63b. The heater 42 is disposed at a position corresponding to a position between the second area A2 and the third area A3. As shown in FIG. 11, in the interior of the heater case 41f, the upstream side of the heater 42 in the air flow direction in the first air path P1 forms a pre-heater space 41f1. The pre-heater space 41f1 is disposed in the third area A3 (see FIG. 3 and FIG. 4). Air before being heated by the heater 42 is introduced into the pre-heater space 41f1.

In the interior of the heater case 41f, the downstream side of the heater 42 in the air flow direction in the first air path P1 forms a post-heater space 41f2. The post-heater space 41f2 is disposed in the second area A2 (see FIG. 3 and FIG. 4). Air after heated by the heater 42 is introduced into the post-heater space 41f2.

Figure 12:
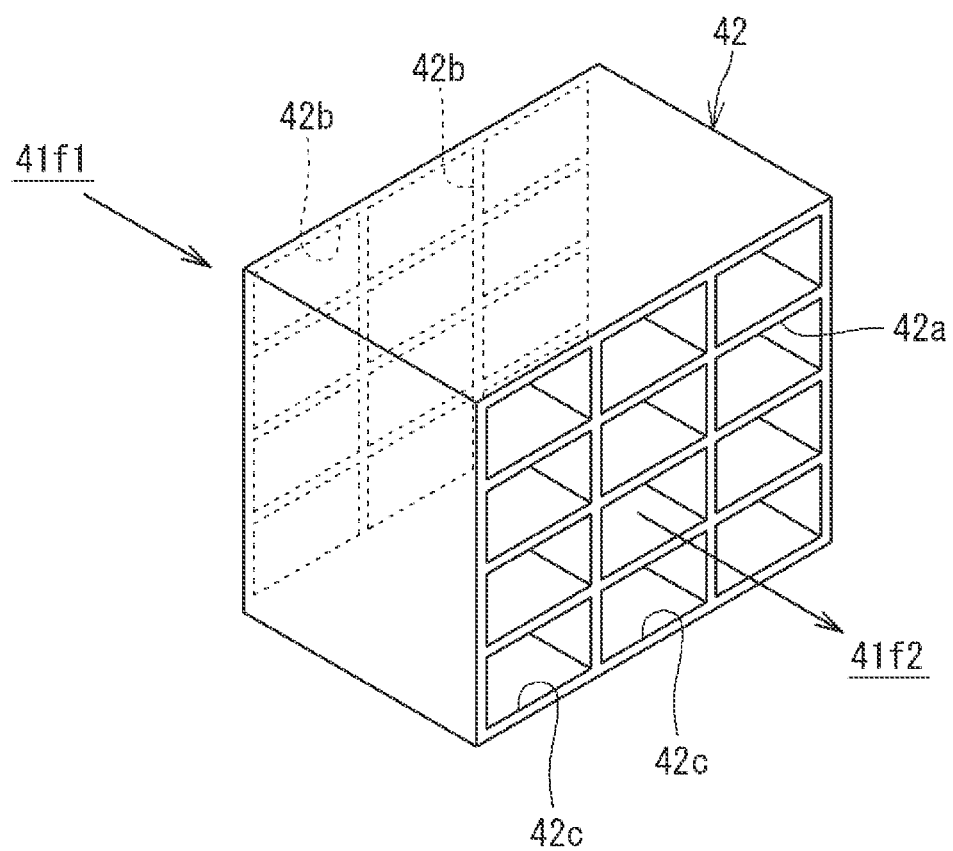
FIG. 12 is a perspective view of a heater.

FIG. 12 is a perspective view of the heater 42. The heater 42 includes metal, for example, and has a quadrangular cross section. The heater 42 has a grid-like frame body 42a in order to increase a contact area with the air passing through the interior thereof. One open end of the heater 42 is an inlet 42b for air, and the other open end of the heater 42 is an outlet 42c for air.

The heater 42 is disposed such that the inlet 42b faces the pre-heater space 41f1 and the outlet 42c faces the post-heater space 41f2. The air in the pre-heater space 41f1 is introduced into the heated heater 42 from the inlet 42b, and is heated by being in contact with the frame body 42a and the like when passing through the interior of the heater 42. The heated air moves from the outlet 42c of the heater 42 to the post-heater space 41f2, and heats the adsorption member 41a located above the post-heater space 41f2 (see FIG. 3). Therefore, the heater 42 indirectly heats the adsorption member 41a.

The heater 42 may directly heat the adsorption member 41a instead of heating the air. In this case, for example, the heater 42 may be disposed above the adsorption member 41a, and the adsorption member 41a may be heated by radiant heat of the heater 42.

As shown in FIG. 3, the adsorption member 41a has the first area (moisture adsorption area) A1, the second area (moisture release area) A2, and the third area A3 in plan view. The first area A1, the second area A2, and the third area A3 each are set to have an angular range of 120° about the center O of the adsorption member 41a. The first area A1 is adjacent to the second area A2 and the third area A3. The second area A2 is adjacent to the first area A1 and the third area. A3. The third area A3 is adjacent to the first area A1 and the second area A2.

The first area A1 to the third area A3 are areas fixed to certain positions. Therefore, as the adsorption member 41a rotates in the direction of arrow B, the first area A1 to the third area A3 relatively move on the adsorption member 41a.

The first area A1 is set to have an angular range of 120° in the direction opposite to the arrow B from the vertical plate 63a of the third partition plate 63. As a result, the first area A1 is interposed between the first space R1 and the sixth space R6.

When outdoor cold air is introduced into the first space R1 from the intake port 55, part of the air passes through the first area A1 of the adsorption member 11a and flows to the sixth space R6. The first area A1 of the adsorption member 41a is cooled by air to have a lower temperature. Therefore, the first area A1 of the adsorption member 41a adsorbs moisture in the air passing through the adsorption member 41a. When the adsorption member 41a rotates after the first area A1 of the adsorption member 41a has adsorbed moisture in air, the part that has been the first area A1 becomes the second area A2.

The second area A2 is formed in an angular range of 120° in the direction of the arrow B from the vertical plate 63a of the third partition plate 63 to the inclined plate 63b. The second area A2 is interposed between the second space R2 and the post-heater space 41f2 of the heater case 41f. The air heated by the heater 42 in the heater case 41f moves from the post-heater space 41f2 to the second space R2 through the second area A2 of the adsorption member 41a. At this time, the second area A2 of the adsorption member 41a is heated by air to have a higher temperature, and thus releases moisture to the air passing through the second area A2 to humidify the air.

The third area A3 is formed in an angular range of 120° in the direction of the arrow B from the inclined plate 63b of the third partition plate 63. The third area A3 is interposed between the first space R1 and the pre-heater space 41f1 of the heater case 41f. When outdoor cold air is introduced into the first space R1 from the intake port 55, part of the air passes through the third area A3 of the adsorption member 41a and moves to the pre-heater space 41f1. At this time, the third area A3 of the adsorption member 41a is preliminarily cooled by the cold air. The cold air is preliminarily heated by the third area A3 of the adsorption member 41a. The adsorption member 41a need not necessarily have the third area A3.

As described above, the moisture adsorption rotor 41 is capable of adsorbing moisture in the air flowing through the first air path P1 in the first area A1 and humidifying the air flowing through the second air path P2 in the second area A2 by rotating the single adsorption member 41a, and hence the humidifying unit 3 can be made compact.

Summary of Air Path

As shown in FIG. 3 and FIG. 4, when the second fan 44 is actuated, outdoor air is introduced into the first space R1 of the housing body 50 from the intake port 55 of the introduction connection pipe 52. The air introduced into the first space R1 passes through the first area A1 of the adsorption member 41a, and moves to the sixth space R6, and then discharged to the outside from the discharge port 56 of the discharge connection pipe 53.

Therefore, in the present embodiment, an inner space of the introduction connection pipe 52, and inner spaces of the first space R1, the sixth space R6, and the discharge connection pipe 53 constitute the second air path P2 through which air flows from the intake port 55 to the discharge port 56. The first area A1 of the adsorption member 41a and the second fan 44 are disposed in a midway of the second air path P2. The adsorption member 41a of the moisture adsorption rotor 41 adsorbs moisture in the air flowing through the second air path P2 in the first area A1.

Then the second fan 44 is actuated, air in the target space S1 flows into the seventh space R7 from the inflow port 72 formed in the panel 51. The air introduced into the seventh space R7 flows near the temperature and humidity sensor 45, passes through the opening 68a, flows into the sixth space R6, and is discharged to the outside from the discharge port 56 of the discharge connection pipe 53. Therefore, in the present embodiment, the seventh space R7 constitutes the third air path P3.

The third air path P3 joins the second air path P2 in the opening 68a and is discharged to the outside. Since the air flowing through the third air path P3 is used merely for detecting temperature and humidity of the target space S1, and is discharged to the outside without passing through the moisture adsorption rotor 41, the air does not contribute to humidification of the target space S1 at all. Therefore, the air volume of the air flowing through the third air path P3 is set to be smaller than the air volume of the air flowing through the second air path P2 and the first air path P1. In the present embodiment, the air volume of the air flowing through the third air path P3 is set to be small by adjusting the area of the opening 68a to be as small as possible, and thus deterioration in humidifying efficiency of the target space S1 is suppressed.

The third air path P3 joins the second air path P2 on a downstream side of the adsorption member 41a in the second air path P2. If the third air path P3 joins the second air path P2 on an upstream side of the adsorption member 41a, there is a fear that warm air in the target space S1 passes through the first area A1 of the adsorption member 41a to prevent adsorption of moisture to the adsorption member 41a. In the present embodiment, since the third air path P3 joins the second air path P2 on a downstream side of the adsorption member 41a, it is possible to perform adsorption of moisture by the adsorption member 41a efficiently.

When the second fan 44 is actuated, the air flown from the intake port 55 flows into the cooling space R4a in the fourth space R4 from the inflow port 74b formed in the attachment frame 74 of the air filter 73. The air flown into the cooling space R4a cools the heat generating component of the controller 46, and then passes through the opening 66a formed in the sixth partition plate 66, flows into the sixth space R6, and then is discharged to the outside from the discharge port 56. Therefore, in the present embodiment, the cooling space R4a of the fourth space R4 constitutes the fourth air path P4.

The fourth air path P4 joins the second air path P2 on a downstream side of the adsorption member 41a in the second air path P2. Therefore, the route of air passing through the second air path P2 from the fourth air path P4, and being discharged to the outside is a path that does not pass through the first area A1 of the adsorption member 41a. If the fourth air path P4 joins the second air path P2 on an upstream side of the adsorption member 41a, there is a fear that warm air after cooling the heat generating component passes through the first area A1 of the adsorption member 41a to prevent adsorption of moisture to the adsorption member 41a. In the present embodiment, since the fourth air path P4 joins the second air path P2 on a downstream side of the adsorption member 41a, and the warm air after cooling the heat generating component does not flow through the first area A1 of the adsorption member 41a, it is possible to perform adsorption of moisture by the adsorption member 41a efficiently.

When the first fan 43 is actuated during the humidifying operation, outdoor air is introduced into the first space R1 from the intake port 55 of the introduction connection pipe 52, passes through the third area A3 of the adsorption member 41a, and moves to the pre-heater space 41f1 of the heater case 41f. The air that has moved to the pre-heater space 41f1 is heated by the heater 42 in the heater case 41f, moves to the post-heater space 41f2, passes through the second area A2 of the adsorption member 41a, and moves to the second space R2. The air that has moved to the second space R2 is blown out to the target space S1 from the blowout port 54 of the panel 51 by the first fan 43.

Therefore, in the present embodiment, an inner space of the introduction connection pipe 52, the first space R1, the pre-heater space 41f1, the post-heater space 41f2, and the second space R2 constitute the first air path P1 through which air flows from the intake port 55 to the blow-out port 54. The third area A3 and the second area A2 of the adsorption member 41a, the heater 42, and the first fan 43 are disposed in a midway of the first air path P1.

In the first air path P1, the air before being heated by the heater 42 passes through the third area A3 of the adsorption member 41a to preliminarily cool the adsorption member 41a. The adsorption member 41a releases moisture to the air by passage of the air heated by the heater 42 through the second area A2 of the adsorption member 41a. As a result, the air passing through the second area A2 of the adsorption member 41a is humidified.

During the humidifying operation, both the air flowing through the first air path P1 and the air flowing through the second air path P2 pass through the same space, namely, the first space R1. However, a partitioning wall for distributing the air flowing through the first air path P1 and the second air path P2 is not provided in the first space R1. This owes to the fact that difference in sucking force of air is generated between the second fan 44 and the first fan 43 because the second fan 44 is driven with a larger air volume than the first fan 43, and the air is distributed into the first air path P1 and the second air path P2 by the difference in sucking force. Since both the air flowing through the first air path P1 and the air flowing through the second air path P2 pass through the same space, namely the first space R1, it is possible to simplify the structure in the housing body 50.

When the first fan 43 and the second fan 44 are actuated during the ventilation operation, outdoor air flows through the first air path P1 and the second air path P2 similarly to the humidifying operation. However, since the moisture adsorption rotor 41 and the heater 42 are not driven, the air flowing through the first air path P1 is released from the blow-out port 54 of the panel 51 into the target space S1 without being humidified by the adsorption member 41a of the moisture adsorption rotor 41. Not only the first fan 43 but also the second fan 44 is driven during the ventilation operation because it can be difficult to drawing outdoor air in via the introduction duct 48 by driving only the first fan 43 because the first fan 43 generates less air volume of air flow than the second fan 44.

Air Volume Control of First Fan 43 and Second Fan 44

The first fan 43 and the second fan 44 each are controlled by the controller 46 to have such an operation frequency (number of rotations) that generates an air flow of a predetermined air volume. The air volume by the first fan 43 and the air volume by the second fan 44 are set, for example, at a ratio of 1:5.

As shown in FIG. 1, when the introduction duct 48 connected with the introduction connection pipe 52 is long, it is necessary to increase the operation frequencies of the first fan 43 and the second fan 44 so as to draw outdoor air into the housing 47. Therefore, the first fan 43 and the second fan 44 each are operated at an appropriate operation frequency by the controller 46.

As the operation frequency of the second first 44 is increased, the air volume of the air flowing through the seventh space R7, and the air volume of the air flowing through the fourth space R4 also increase. The air flowing through the seventh space R7 is used merely for detecting temperature and humidity of the target space S1, and the air flowing through the fourth space R4 is used merely for cooling the heat generating component, and both of these airs are not used for humidifying air, and hence a loss for humidification increases as the air volume increases. Therefore, in the present embodiment, by adjusting an opening degree of the opening (junction port) 68a connecting the seventh space R7 and the sixth space R6, and an opening degree of the opening (junction port) 66a connecting the fourth space R4 and the sixth space R6 respectively with the adjustment plates 68b and 66b, it is possible to suppress the increase in air volume of the air flowing through the seventh space R7 and the fourth space R4 even when the operation frequency of the second fan 44 is increased.

Other Embodiments

The fourth air path P4 for cooling the heat sink 84 may be joined with the first air path P1 rather than with the second air path P2, and may be blown out to the target space S1 from the blow-out port 54. In this case, the fourth air path P4 can join on an upstream side in the air flow direction of the heater 42 in the first air path P1.

The third air path P3 for detecting temperature and humidity of the target space S1 may join on an upstream side of the first fan 43 in the first air path P1. Specifically, the third air path P3 may join on an upstream side or on a downstream side of the adsorption member 41a in the first air path P1. It is also possible that the third air path P3 joins on an upstream side of the adsorption member 41a in the second air path P2.

In the above embodiment, while the first air path P1 and the second air path P2 are formed by the common first space R1 in the housing body 50, they may be formed by different spaces. In this case, the first air path P1 and the second air path P2 may take air in from individual intake ports.

While the moisture adsorption rotor 41 of the above embodiment rotates the adsorption member 41a by a gear mechanism composed of the ring gear 41b and the pinion gear 41c, the adsorption member 41a may be rotated by other rotation transmission mechanism using a belt, a chain and the like.

In the above embodiment, while the temperature and humidity sensor 45 is provided in the seventh space R7, a humidity sensor that detects only humidity may be provided. The temperature sensor and the humidity sensor may be separately provided.

Action and Effects of Embodiments

When the heater or the fan of the humidity control device is driven by an electric circuit including a heat generating component such as a switching element or the like, it is necessary to cool the heat generating component so as to ensure the reliability. When the heat generating component is cooled by using the air introduced into the housing from the outside, the heat generating component can be cooled efficiently. However, if heated air after cooling the heat generating component passes through the humidity control member, humidification performance may be adversely affected. In the humidity control device of Japanese Laid-Open Patent Publication No, 2006-170492, cooling of the heat generating component as described above is not taken into account at all. Therefore, it is an object of the present disclosure to provide a humidifying unit capable of cooling a heat generating component without adversely affecting humidification of the target space.

(1) The humidifying unit 3 of the above embodiment includes the adsorption member 41a having the first area (moisture adsorption area) A1 for adsorbing moisture and the second area (moisture release area) A2 for releasing moisture; the heater 42 that heats the second area A2 of the adsorption member 41a, the first fan 43 and the second fan 44 that generate an air flow; the housing 47 that accommodates the adsorption member 41a, the heater 42, the first fan 43, and the second fan 44; the controller electric component) 46 including a heat generating component; and the heat sink (cooler) 84 that air-cools the heat generating component. The housing 47 has a humidifying air path (first and second air paths) P1 and P2 through which air taken from outside the housing 47 by the first fan 43 and the second fan 44 is discharged outside the housing 47 via the adsorption member 41a, and a cooling air path P4 in which the heat sink 84 is disposed and the air taken from outside the housing 47 by the first fan 43 and the second fan 44 joins the humidifying air path P1 and P2. The route of air passing through the humidifying air path P1 and P2 from the cooling air path P4, and being discharged outside the housing 47 is a route that does not pass through the first area A1 of the adsorption member 41a.

With the above configuration, it is possible to cool the heat generating component by supplying the heat sink 84 with air taken from outside the housing 47 by flowing the air through the cooling air path P4. Since the warm air after cooling the heat generating component flows through the humidifying air path P1 and P2, and is discharged outside the housing 47 without flowing through the first area A1 of the adsorption member 41a, the moisture adsorption efficiency in the adsorption member 41a is not impaired, and adverse effect exerted on the humidification performance can be prevented.

(2) The humidifying air path P1 and P2 include the first air path P1 through which the air taken from the outside is blown out to the target space S1 via the second area A2 of the adsorption member 41a, and the second air path P2 through which the air taken from the outside is discharged to the outside via the first area A1 of the adsorption member 41a. With such a configuration, it is possible to adsorb moisture on the adsorption member 41a by the air flowing through the second air path P2, and release the moisture of the adsorption member 41a to the air flowing through the first air path P1, thereby humidifying the target space S1.

(3) The cooling air path P4 joins on a downstream side in the air flow direction of the first area. A1 in the second air path P2. Therefore, the air heated by the heat sink 84 in the cooling air path P4 can be joined with the air whose moisture has been adsorbed to the adsorption member 41a in the second air path P2, and the joined air can be discharged from the discharge port 56.

(4) In other embodiment, the cooling air path P4 may be joined on an upstream side in the air flow direction of the heater 42 in the first air path P1. In this case, by flowing the air heated by the heat sink 84 in the cooling air path P4 through the first air path P1, the air before passing through the heater 42 can be preliminarily heated in the first air path P1, and the output of the heater 42 can be suppressed.

(5) The housing 47 has the junction port 66a for joining the cooling air path P4 with the humidifying air path P1 and P2, and the opening area of the junction port 66a is adjustable. Since the air volume of the air of the cooling air path P4 can be adjusted by adjusting the opening area of the junction port 66a, it is possible to flow an appropriate air volume of the air to the cooling air path P4 in accordance with the operation frequency of the second fan 44 or the first fan 43.

(6) For the humidifying air path P1 and P2 and the cooling air path P4, air is taken into the housing 47 from the common intake port 55. With such a configuration, it is possible to minimize the number of the intake ports 55 formed in the housing 47. It is also possible to minimize the number of the introduction ducts 48 connected with the intake ports 55.

The present disclosure should not be limited to the above exemplification, but is intended to include any modification recited in claims within meanings and a scope equivalent to those of the claims.

The invention claimed is:

1. A humidifying unit configured to humidify a target space, the humidifying unit comprising:
   an adsorption member haling a moisture adsorption area configured to adsorb moisture and a moisture release area configured to release moisture;
   a heater configured to heat the moisture release area of the adsorption member;
   fans configured to generate an air flow;
   a housing that accommodates the adsorption member, the heater, and the fans;
   an electric component including a heat generating component; and
   a cooler configured to air-cool the heat generating component, the housing having
- a humidifying air path through which air taken from outside the housing by the fans is discharged outside the housing via the adsorption member, and
- a cooling air path in which the cooler is disposed, and air taken from outside the housing by the fans is joined with the humidifying air path, a route of air passing through the humidifying air path from the cooling air path and being discharged outside the housing not passing through the moisture adsorption area of the adsorption member.

2. The humidifying unit according to claim 1, wherein the humidifying air path includes
- a first air path through which air taken from outside is blown out to the target space via the moisture release area of the adsorption member, and
- a second air path through which air taken from the outside is discharged to the outside via the moisture adsorption area of the adsorption member.

3. The humidifying unit according to claim 2, wherein the cooling air path joins on a downstream side in an air flow direction of the moisture adsorption area in the second air path.

4. The humidifying unit according to claim 2, wherein the cooling air path joins on an upstream side in an air flow direction of the heater in the first air path.

5. The humidifying unit according to claim 3, wherein the housing has a junction port that joins the cooling air path with the humidifying air path, and an opening area of the junction port is adjustable.

6. The humidifying unit according to claim 4, wherein the housing has a junction port that joins the cooling air path with the humidifying air path, and an opening area of the junction port is adjustable.

7. The humidifying unit according to claim 1, wherein for the humidifying air path and the cooling air path, air is taken into the housing from a common intake port.

8. The humidifying unit according to claim 2, wherein for the humidifying air path and the cooling air path, air is taken into the housing from a common intake port.

9. The humidifying unit according to claim 3, wherein for the humidifying air path and the cooling air path, air is taken into the housing from a common intake port.

10. The humidifying unit according to claim 4, wherein for the humidifying air path and the cooling air path, air is taken into the housing from a common intake port.

11. The humidifying unit according to claim 5, wherein for the humidifying air path and the cooling air path, air is taken into the housing from a common intake port.

12. The humidifying unit according to claim 6, wherein for the humidifying air path and the cooling air path, air is taken into the housing from a common intake port.

* * * * *